United States Patent [19]

Miyamoto et al.

[11] Patent Number: 4,823,185
[45] Date of Patent: Apr. 18, 1989

[54] COLORIMETRIC CIRCUIT WITH STORAGE OF SIMULTANEOUSLY DETECTED COLOR COMPONENTS

[75] Inventors: Ryosuke Miyamoto; Shinji Sakai, both of Kanagawa, Japan

[73] Assignee: Canon Kabushiki Kaisha, Tokyo, Japan

[21] Appl. No.: 114,091

[22] Filed: Oct. 27, 1987

[30] Foreign Application Priority Data

Oct. 30, 1986 [JP] Japan .............................. 61-260243

[51] Int. Cl.$^4$ ............................................. H04N 9/73
[52] U.S. Cl. ....................................... 358/29; 358/41; 356/405; 356/425; 250/226
[58] Field of Search ................... 358/29 C, 41, 43, 44, 358/50; 356/405, 406, 407, 425; 250/226

[56] References Cited

U.S. PATENT DOCUMENTS

| | | | |
|---|---|---|---|
| 4,395,730 | 7/1983 | Shen | 358/29 C |
| 4,414,635 | 11/1983 | Gast et al. | 356/405 X |
| 4,616,253 | 10/1986 | Hashimoto et al. | 358/29 C |
| 4,633,300 | 12/1986 | Sakai | 358/29 C X |
| 4,646,161 | 2/1987 | Tsuchiya et al. | 358/41 X |
| 4,660,075 | 4/1987 | Hashimoto et al. | 358/29 C |

FOREIGN PATENT DOCUMENTS

| | | | |
|---|---|---|---|
| 55-135721 | 10/1980 | Japan | 356/405 |
| 55-165085 | 12/1980 | Japan | 358/44 |
| 60-192485 | 9/1985 | Japan | 358/29 C |

Primary Examiner—James J. Groody
Assistant Examiner—E. Anne Faris
Attorney, Agent, or Firm—Robin, Blecker & Daley

[57] ABSTRACT

A colorimetric circuit comprising three detectors for detecting red, green and blue components respectively, a memory for storing the outputs of the detectors sampled at the same instant in logarithmically compressed form, and a control circuit for reading out the contents of the memory in sequence, thereby it being made possible to improve the accuracy of colorimetry.

17 Claims, 5 Drawing Sheets

FIG.3

|     | A | B | C | (a) | (b) | (c) | (d) | (e) |
|-----|---|---|---|-----|-----|-----|-----|-----|
| (f) | 1 | 1 | 1 | 1 | 0 | 0 | 0 | 1 |
| (g) | 1 | 1 | 0 | 0 | 1 | 1 | 1 | 1 |
| (h) | 1 | 0 | 1 | 1 | 0 | 0 | 0 | 0 |
| (i) | 1 | 0 | 0 | 0 | 1 | 1 | 0 | 0 |
| (j) | 0 | 1 | 1 | 1 | 0 | 0 | 0 | 0 |
| (k) | 0 | 1 | 0 | 0 | 1 | 0 | 1 | 0 |
| (ℓ) | 0 | 0 | 1 | 1 | 0 | 0 | 0 | 0 |
| (m) | 0 | 0 | 0 | 0 | 0 | 0 | 0 | 0 | ively detected color components

COLORIMETRIC CIRCUIT WITH STORAGE OF SIMULTANEOUSLY DETECTED COLOR COMPONENTS

BACKGROUND OF THE INVENTION

1. Field of the Invention:

This invention relates to color video cameras and, more particularly, to a colorimetric circuit for white balance adjustment wherein the colorimetric sensor portion is provided with a plurality of sensor elements.

2. Description of the Related Art:

Of the conventional color video cameras capable of automatically adjusting the white balance in accordance with the ambient color temperature of an object to be photographed, the widely known type is that wherein the dichromatic sensor responsive to the red and blue primaries is used for detecting the color temperature in terms of a ratio of the red and blue components (or R/B). The gain control for the chrominance signal is based on this information.

But, under such an illumination as with fluorescent lamps, because the green component is strong, the use of the red- and blue-responsive sensor elements alone leads to a difficulty of accurate adjustment of the white balance.

So, a trichromatic sensor responsive to the red, green and blue primaries is instead used to yield R/G and B/G. By adjusting the gain of the amplifier for the chrominance signal in accordance with these two ratios, it is possible to obtain video signals of correct color balance even when the illumination light source has a special distribution of energy throughout the spectrum such as that of the fluorescent lamp. A video camera employing this technique is disclosed, for example, in U.S. Pat. No. 4,616,253.

However, because such prior art camera makes use of a separate arrangement of a plurality of colorimetric sensors, the influence of an error caused by the difference between base outputs of the sensors is not negligible.

Particularly, change of the temperature affects the difference between the response characteristics of the amplifiers for logarithmic compression of the outputs of the respective sensors. Hence, the color balance is liable to error. There is another drawback in that a differential amplifier of high precision accuracy has to be used.

One method of eliminating these drawbacks is disclosed in Japanese Laid-Open patent application No. Sho 60-94589.

Its constructional feature is that the outputs of the color sensors are selected for successive application to one logarithmic compression amplifier whose output is then, in timed relationship, stored in a memory of a microcomputer. By virtue of computation, the aforesaid necessity of using the differential amplifier is removed and the possibility of occurrence of a difference between any two of the amplifiers is reduced to zero.

In this case, however, because it is in a time-displaced relation that the outputs of all the colorimetric sensors are sampled, if the light source includes ripples, an error is produced.

SUMMARY OF THE INVENTION

The present invention has a general object the elimination of the above-described problem.

To achieve this object, in an embodiment of the invention, a colorimetric circuit is provided with a plurality of detecting portions for detecting the different color components from each other, memory means for storing the detection outputs of all the detecting portions at once, and control means for causing the informations of the memory means to be taken out in sequence.

The above-described construction and arrangement of the circuit elements allows the outputs of the plurality of color sensors to be sampled all at once and, after having once been stored in the memory, to be taken out successively as the operation of the memory is controlled by the control means. Therefore, the colorimetric circuit is freed very easily from the same-phase noise which would otherwise be produced when the comparator is used as in the prior art.

Also, since those outputs of all the color sensors which occur at the same time are stored, the stability against change of the color temperature is strong. Particularly, when recording a still picture, the colorimetering period can be brought into coincidence with the image pick-up period, even though the latter is as short as the shutter runs at a high speed. Therefore, despite the color temperature of the light source flickers, one can assure accurate adjustment of the white balance.

Other objects and features of the invention will become apparent from the following description of embodiments thereof by reference to the drawings.

BRIEF DESCRIPTION OF THE DRAWINGS

FIG. 3 is a table of logic functions for converting the inputs of the decoder into its outputs.

DETAILED DESCRIPTION OF THE PREFERRED EMBODIMENT

Figure 1:
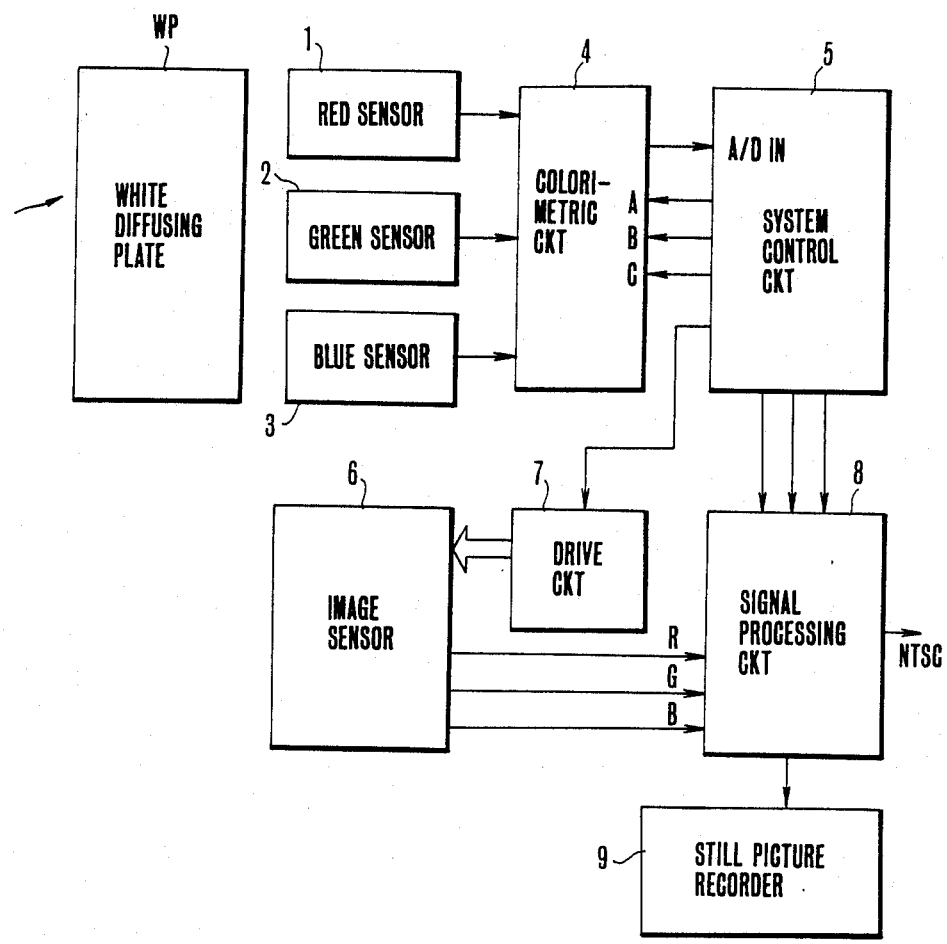
FIG. 1 is a block diagram of a color video camera employing the colorimetric circuit of the invention.

In FIG. 1 there is shown a white balance control system of the invention.

A white diffusing plate WP is positioned in front of the detecting portion in the form of three sensors 1 to 3 for the primary colors R, G and B respectively which are connected to a common colorimetric circuit 4. A system control circuit 5 controls not only the circuit 4 but a drive circuit 7 for an image sensor 6 such as CCD and a signal processing circuit 8. In the circuit 8, the color signals, for example, red (R), green (G) and blue (B) signals, from the image sensor 6 each are subjected to gamma and contour corrections and encoded to form a video signal of, for example, the NTSC standards, which is further so modulated as to be suitable for driving a still picture recorder 9. In order to adjust the white balance, the channels for the R, G and B signals in the circuit 8 have respective gain control amplifiers whose gains are controlled by the respective control signals produced from the system control circuit 5. It is to be noted here that the set of primary colors of the signals the image sensor 6 produces may otherwise include complementary colors, as consists of, for example, Ye, G and Cy. For this case, the signal processing circuit 8 is modified so that such color signals can be mixed to form the R, G and B signals. It is also to be noted that the gain control for the G channel may be omitted in some case.

Figure 2:
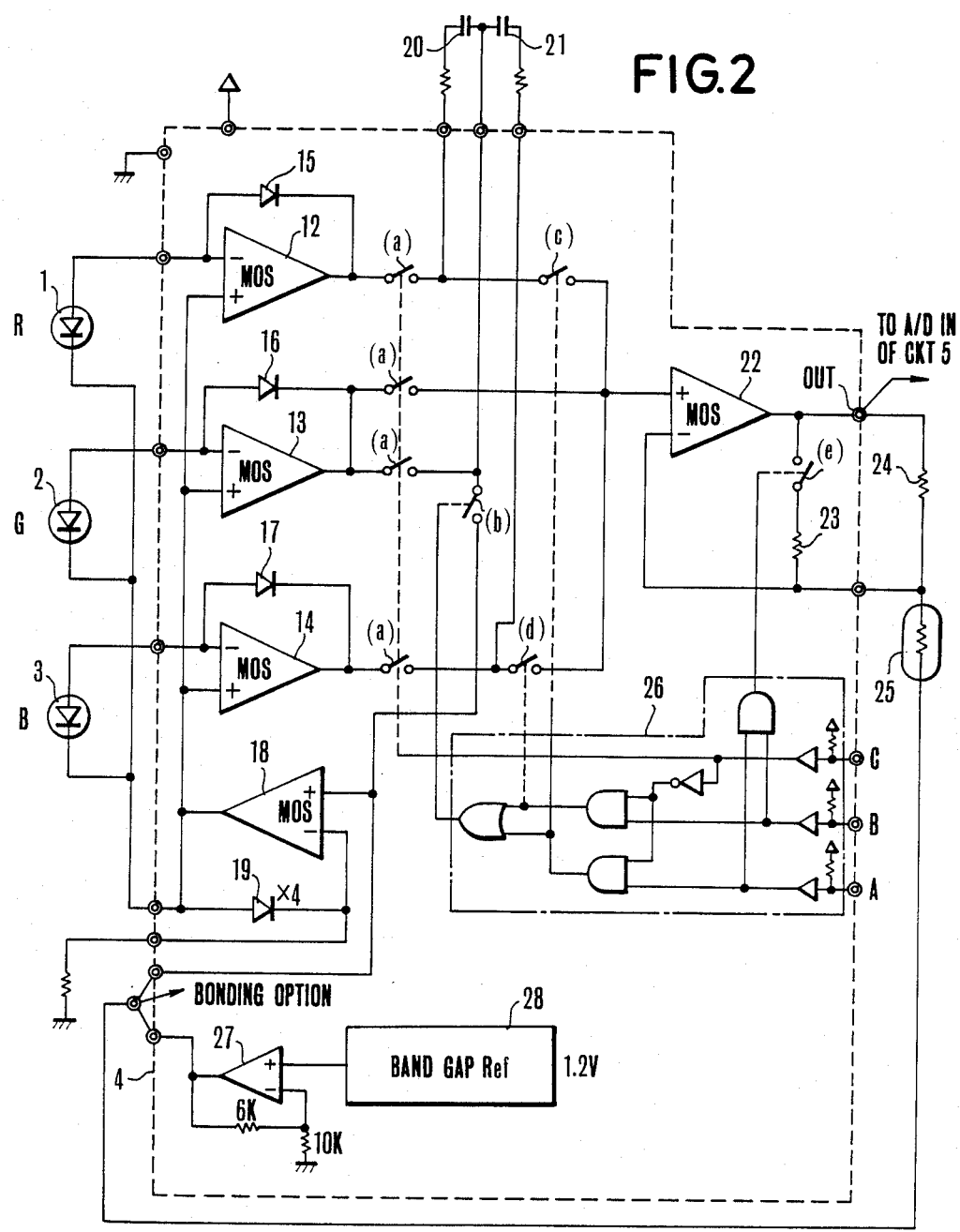
FIG. 2 is an electrical circuit diagram illustrating the details of an example of the colorimetric circuit of the invention.

An example of the colorimetric circuit 4 of FIG. 1 is shown in FIG. 2, comprising operational amplifiers 12 to 14, 18, 22 and 27, logarithmic compression diodes 15 to 17, another diode 19, capacitors 20 and 21 as the memory means for storing informations of log(R/G) and log(B/G) respectively, gain-adjusting resistors 23 and 24, a temperature compensation resistor 25, a decoder 26, a reference voltage source 28 and switches (a) to (e). The amplifier 18 and the diode 19 constitute a constant current source. FIG. 3 shows how each set of logic values of the control outputs A, B and C produced from the system control circuit 5 corresponds to one of the combinations of the logic values of the outputs of the decoder 26.

Figure 4:
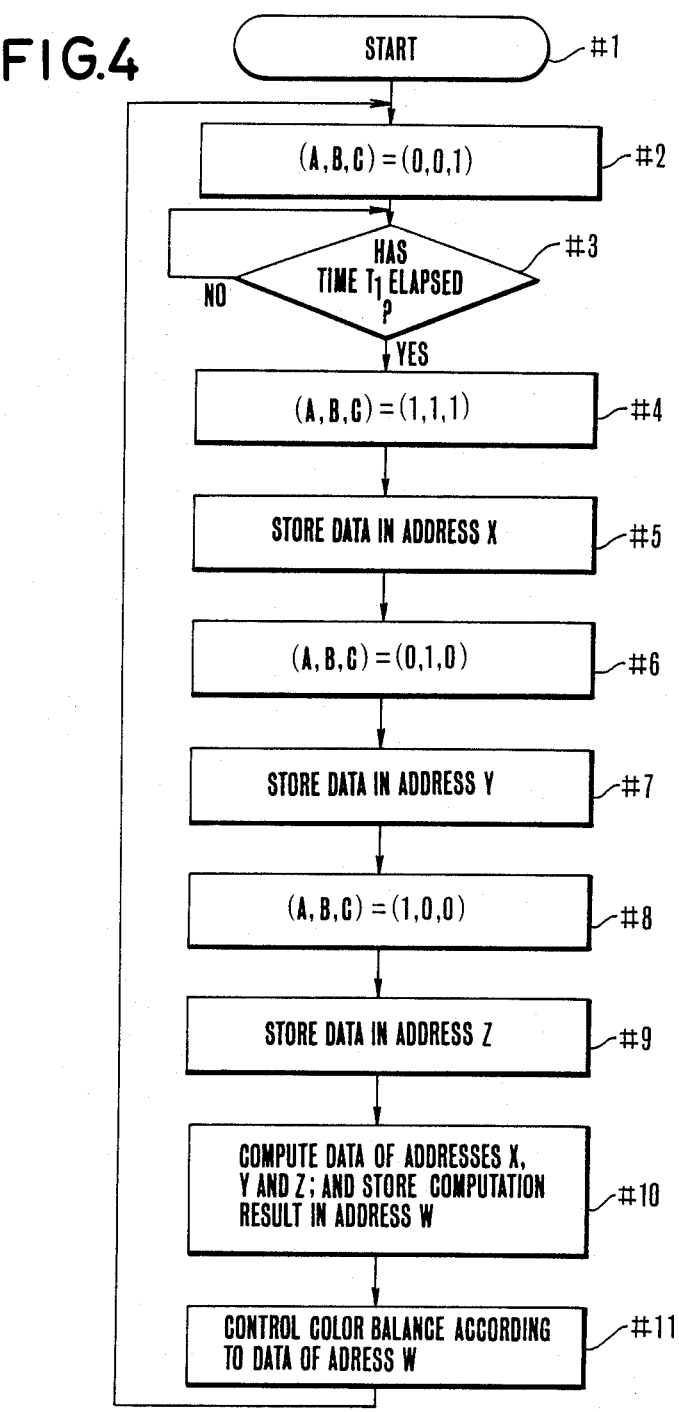
FIG. 4 is a flowchart for the operation of the system control circuit.

Also, FIG. 4 is a flowchart for the sequence of operations of the system control circuit 5.

The operation of this embodiment is described on the basis of the flowchart of FIG. 4.

The system control circuit 5 after having started at a step #1 sets the control outputs A, B and C to (0, 0, 1) respectively by a step #2. For this, as shown on a row (l) in FIG. 3, the switches (a) only are turned on, while the other switches are left in off state.

Under this condition, the outputs of the amplifiers 12, 13 and 14 representing respectively the logarithms of the outputs, r, g and b, of the R, G and B sensors 1, 2 and 3, or log r, log g and log b, are sampled all at exactly the same instant, and stored as information of the ratios on one capacitor 20 in the form of log r−log g=log(r/g) and on the other capacitor 21 in the form of log b−log g=log(b/g).

After having waited a short time $T_1$ necessary to charge the capacitors 20 and 21 in a step #3, the next step #4 follows to alter the set of outputs A, B and C, for now, to (1, 1, 1). Thereby, as shown on row (f) in FIG. 3, the switches (a) and (e) are ON, leaving the others OFF.

In this stage, because the switch (e) is closed, the gain of the amplifier 22 for the signal of log g is reduced. The reason why the gain reduction is made here is that since, at this time, the output of the G sensor 2 is directly read out, if this measure were not taken, the output of the amplifier 22 would saturate.

The gain-reduced signal from a terminal OUT is applied to a terminal A/D IN of the system control circuit 5, where it is converted to a digital signal by an A/D converter included in the circuit 5, which is then memorized at an address X in the memory (step #5).

In the next step #6, the outputs A, B and C are changed to (0, 1, 0) which correspond to a row (k) in FIG. 3 where the switches (b) and (d) turn on, leaving the others OFF.

Therefore, the capacitor 21 is brought into connection across the two inputs of the amplifier 22 so that the signal of log(b/g) is transferred through the terminal OUT to the circuit 5.

And, in a step #7, this data is stored at an address Y in the memory.

In the next step #8, the outputs A, B and C are changed to (1, 0, 0) which corresponds to a row (i) in FIG. 3 where the switches (b) and (c) turn on, leaving the others OFF. By this, the signal of log(r/g) from the capacitor 20 is applied through the amplifier 22 to the circuit 5 and stored at another address Z in the memory (step #9).

In such a manner, the digital data of log g, log(r/g) and log(b/g) are memorized. Upon completion of this operation, the data of these addresses X, Y and Z are then computed. The computation result is memorized at an address W.

Based on this data of the address W, the signal processing circuit 8 then performs color balance adjustment (step #11).

In more detail, log(r/g)−log(b/g)=log(r/b) is first sought. Then, for x=log(r/b), whether $$x \leq x_1 \qquad \ldots (1) \text{ or}$$

$$x > x_1 \qquad \ldots (2)$$

where $x_1$ is constant is examined.

Another examination is then made:

$$\log g \leq y_1 \qquad \ldots (3) \text{ or}$$

$$\log g > y_1 \qquad \ldots (4)$$

where $y_1$ is constant If (1) and (4) occur simultaneously as it often happens when the photographic situation is outdoor with abundant green, then the gain for the G channel in the signal processing circuit 8 is left unchanged, while the gain for the R channel is relatively raised, and the gain for the B channel is relatively lowered.

Also, if (2) and (4) occur simultaneously, as it implies that despite the color temperature is low, the proportion of the green component is large, then the gain for the G channel is dropped to large extent, and the gains for the R and B channels are relatively lowered and raised respectively.

Also, in the case of (3), regardless of the determination of which, (1) or (2), occurs, the control is operated in such a manner that the gains for the R and B channels are lowered as log(r/b) increases, while the gain for the G channel is not varied.

When the control of the color balance is complete, the flow returns to the step #2 again, and the foregoing sequence is repeated.

Figure 5:
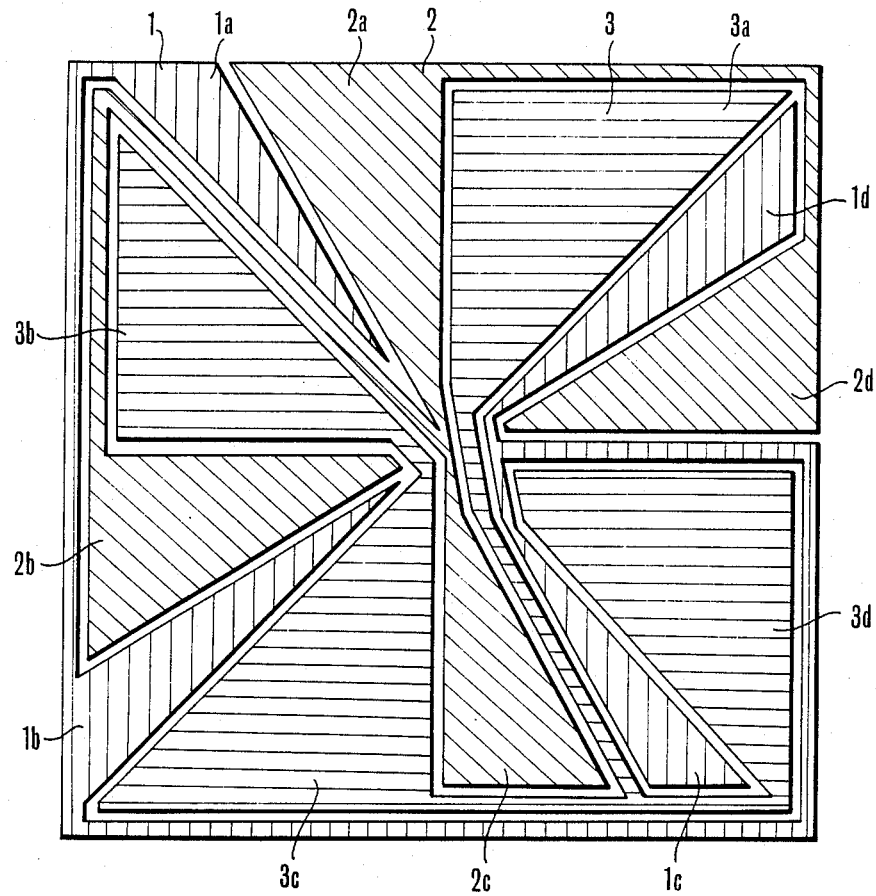
FIG. 5 is a plan view illustrating an example of the structure of a colorimetric sensor.

The color sensors 1, 2 and 3 are constructed, as shown in FIG. 5, with transducer elements 1a–1d, 2a–2d and 3a–3d alternating with each other about the center of the colorimetering area as the axis of symmetry. The use of such a construction and arrangement makes it possible that even when an eclipse takes place in a portion of the colorimetering area, an error due to it is limited to a minimum.

It should also be noted that the ratio of the total sums of the areas in the respective individual sets of the elements 1a–1d, 2a–2d and 3a–3d constituting the color sensor 1, 2 and 3 respectively is so chosen as to compensate that difference of the outputs of all the color sensors which are based on their spectral characteristics with the result that for a white object the ratio of r, g and b in magnitude become 1:1:1.

In actual practice, when SPC is used as the colorimetric sensor, the area ratio of the color sensors 1, 2 and 3 is found to be about 2:3:5.

According to the present invention, without the necessity of using an expensive comparator of high precision accuracy and without displacing the time of sampling the color components, a relatively high accuracy of determination of the color temperature can be attained despite that the colorimetric circuit is constructed in a simple form.

What is claimed is:

1. A colorimetric circuit comprising a plurality of detecting portions for detecting different color components from each other, memory means for memorizing detection outputs of said detecting portions at the same instant, and control means for taking out an output of said memory means in sequence.

2. A colorimetric circuit according to claim 1 wherein said memory means includes a capacitor.

3. A colorimetric circuit according to claim 1 wherein said memory means memorizes logarithmically compressed detection outputs of said detecting portions.

4. A colorimetric circuit according to claim 1, wherein said detecting portions each include a plurality of detecting elements connected to a common output, said plurality of detecting elements being arranged in a positional relationship of rotation symmetry to each other.

5. A colorimetric circuit according to claim 4 wherein areas of said detecting portions differ from each other.

6. A circuit according to claim 1 wherein said circuit receives incoming color image signals, further comprising color balance control means receptive of said color image signals for controlling a color balance of said color image signals in accordance with an output of said control means.

7. An image pickup apparatus comprising:
(a) a plurality of detecting means for detecting different color components from each other;
(b) at least a capacitor having its poles connected to output signals of predetermined two of said plurality of detecting means; and
(c) color temperature information forming means for forming color temperature information from a signal stored on said capacitor.

8. An apparatus according to claim 7, wherein said plurality of detecting means includes at least detecting means for detecting a red component and detecting means for detecting a blue component.

9. An apparatus according to claim 8, wherein said detecting means further includes detecting means for detecting a green component.

10. An apparatus according to claim 7, further comprising first switch means for applying outputs of said plurality of detecting means selectively to said capacitor.

11. An apparatus according to claim 7, further comprising second switch means for connecting said color temperature information forming means to said capacitor selectively.

12. An apparatus according to claim 7, further comprising control means for performing successively a first mode in which outputs of said detecting means are applied to said capacitor and a second mode in which a signal of said capacitor is applied to said color temperature information forming means.

13. An apparatus according to claim 12, wherein said color temperature information forming means includes memory means for storing a signal inputted from said capacitor.

14. An apparatus according to claim 7, wherein said plurality of detecting means each include a plurality of detecting elements connected to a common output, said plurality of detecting elements being arranged in dispersed relation.

15. An apparatus according to claim 14, wherein an area of said commonly connected detecting elements of one of said plurality of detecting means differs from an area of that of another one of said plurality of detecting means.

16. An apparatus according to claim 15, wherein said plurality of detecting means includes at least detecting means for detecting a red component and detecting means for detecting a blue component.

17. An apparatus according to claim 16, wherein an area of said detecting means for detecting a blue component is wider than that of said detecting means for detecting a red component.

* * * * *